UNITED STATES PATENT OFFICE.

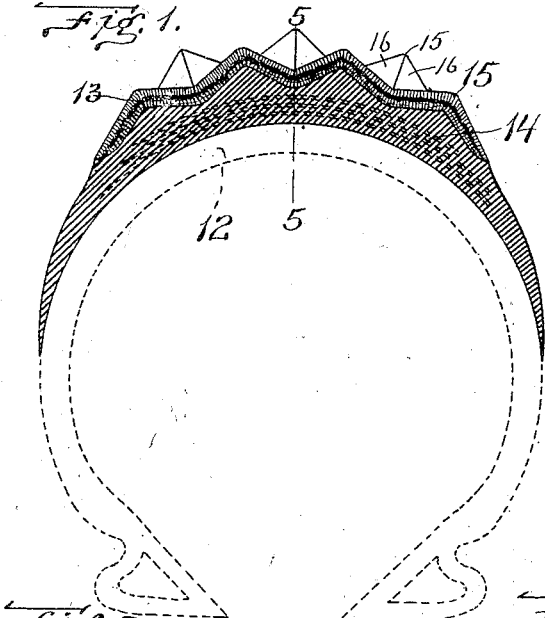
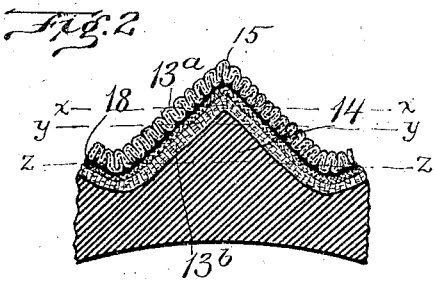
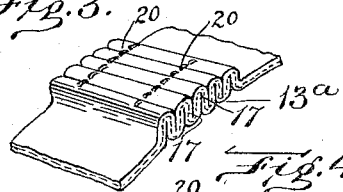
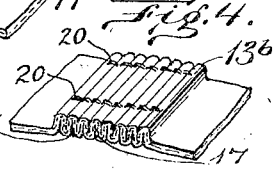
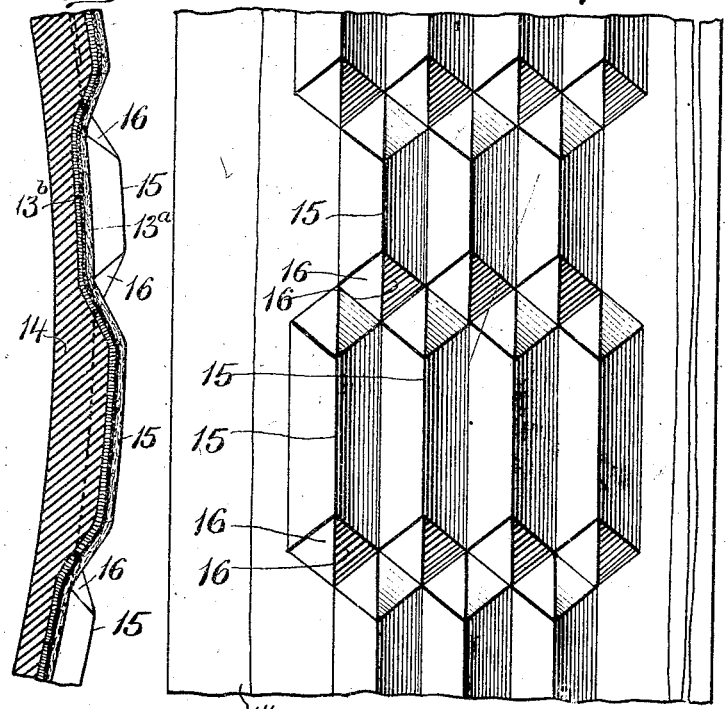

PHILIP W. PRATT, OF BOSTON, MASSACHUSETTS.

ELASTIC TIRE.

1,037,311.  Specification of Letters Patent.  Patented Sept. 3, 1912.

Application filed June 11, 1910. Serial No. 566,331.

*To all whom it may concern:*

Be it known that I, PHILIP WATSON PRATT, of Boston, in the county of Suffolk and State of Massachusetts, have invented certain new and useful Improvements in Elastic Tires, of which the following is a specification.

This invention has special reference to the tread portion of a pneumatic or other elastic tire.

The invention is embodied in a tire tread which, as here shown, forms a part of the shoe of a pneumatic tire.

The invention has for its object to provide a tire tread adapted to resist wear to a greater degree than treads heretofore known, and also to furnish a desirable degree of resistance to side slip or skidding.

The invention consists in improvements which I will now proceed to describe and claim.

Of the accompanying drawings which form a part of this specification,—Figure 1 represents a transverse section of a pneumatic tire shoe embodying my invention. Fig. 2 represents an enlargement of a portion of Fig. 1. Figs. 3 and 4 represent perspective views of portions of the layers of textile fabric hereinafter referred to. Fig. 5 represents a section on line 5—5 of Fig. 1, but not showing the fabric as plaited. Fig. 6 represents a plan view of a portion of my improved tread as it would appear if flattened out.

Similar reference characters indicate the same or similar parts in all the figures.

In Fig. 1 of the drawings I have shown partly by dotted lines a cross section of a pneumatic tire shoe of the clencher type to which a tread embodying my invention is applied, the body portion of the shoe including the means for engaging the wheel rim, being represented by dotted lines and forming no part of the present invention. My invention is embodied in the part represented by full lines in Fig. 1, said part, in this embodiment of the invention, being a tread band formed to be applied to the body portion of the shoe and to surround the same, the outer surface of said tread constituting the tread face of the tire. The said part comprises a facing 13, of frictioned textile fabric, and a backing 14, which for convenience, I will term "rubber," the material of which the backing is made being elastic and containing the percentage of rubber which is usual in so-called "rubber" tires.

The fabric of which the facing is made is preferably duck or canvas, frictioned, or in other words, treated with unvulcanized rubber in solution. The fabric may be incorporated with the rubber backing by suitable molding and vulcanizing operations which need not be herein described. The molds are so shaped, however, that the tread will be formed with elongated ridges 15 which extend length-wise of the periphery of the tread, the said ridges having ends, each formed by two inclined faces 16.

As shown in Fig. 6, the projections are preferably arranged in two series of groups, the projections of one series being longer than those of the other and the ridges 15 of the said projections breaking joint with each other. The ridges constituting elongated projections extending lengthwise of the periphery of the tread, are particularly adapted to prevent side slip or skidding of the tire of which the tread forms a part.

It will be observed that the projections formed by corrugating the textile fabric facing are filled and supported internally by the rubber backing 14, so that the said projections are permanent and durable. Owing to the fact that the corrugated facing is composed of textile fabric, the durability of the tread is much greater than would be the case if its outer surface were only of rubber. The projections formed on the fabric facing, as described, increase the total area of the tread surface and thus bring into use a much larger amount of textile fabric than would be possible if the facing were not corrugated, the durability of the facing as well as its resistance to side slip being correspondingly increased.

The fabric facing 13 is preferably composed of two layers 13ª and 13ᵇ of frictioned textile fabric, each of which is formed into a plurality of narrow folds 17, as shown by Figs. 3 and 4, the fabric being thus disposed in a series of narrow stretches set edgewise to the tread surface, said stretches being connected by the bends or folds of the fabric. The fabric may be transversely stitched as at 20. This formation of the fabric practically increases its thickness and causes the facing to present the ends of many of its threads at the tread surface after the necks connecting the outer edges of the narrow stretches are worn away, said stretches being caused to adhere closely to each other by the frictioning material which is applied to the fabric before it is folded or plaited. The folds of one layer preferably extend cross-wise of the folds of the other layer, as indicated by Figs. 3 and 4.

In assembling the parts, a layer 18 of unvulcanized rubber is interposed between the outer and inner fabric layers, the outer layers then being placed in contact with the corrugated facing of the female mold member.

By the use of the fabric incorporated into the thread as described, the conformation of the ridges is preserved during use, and wear is reduced to the minimum. That is the shape of the ridges will remain unchanged for a far greater period when the fabric is incorporated therewith, than if it is not employed. The fabric is wear-resisting, and moreover, serves as a reinforce to increase the durability of the ridges and preserve their shape under pressure of use. In other words, when the portion of the tread as shown at the top of Fig. 1 is bearing on the ground, and the automobile is heavy so that the pneumatic tire will yield, there is not much change in the shape of the tread itself, because of the reinforcing material employed, and the thickness of the tread. Ordinarily, the tread portion of a tire having my improved structure therein will retain its transversely curved form although the transverse shape may, under pressure, be changed to a curve of greater radius. At any rate, the tire tread remains curved longitudinally and laterally to conform to the exterior of a pneumatic tire. And the ridges extend lengthwise of the periphery of the tread, and as best shown in Fig. 6, the ridges are formed in groups or series, the apexes of the ridges of one series being in longitudinal alinement with the bottoms of the recesses between the ridges of the next series. As best shown in Fig. 1, all of the ridges have angular apexes and the bottoms of the recesses between the ridges are angular. This fact, in connection with the transverse or lateral curvature of the tread causes the tread to present a plurality of flat surfaces which face in different directions and all of which are tangential to the tire. There are always present one or two sharp apexes to bear on a very slightly plastic road surface, with almost horizontal flat surfaces at each side of the center to resist tendency to force the wheel or its tire into a rather muddy surface, while the extreme side planes toward the two margins of the tread, will present obstructions to skidding, in case the roadway is very muddy.

The projections of the rubber backing 14 enter and are vulcanized to the internal corrugations of the wear-and-slip-resisting facing 13. Said projections are higher than the intermediate depressed portions of the facing, the stretches of the facing forming the sides of the corrugations, being firmly held in inclined positions by the projections of the backing to which they are vulcanized. The wear on the facing incidental to use is therefore not sustained at once by all portions of the tread surface but is sustained first by the apexes of the corrugations. When these apexes have been worn away to the apexes of the rubber backing projections, the intermediate depressed portions of the facing remain unworn and a tread surface is formed composed in part of a multiplicity of ends of threads of the plaited fabric exposed by wear, and in part by the exposed portions of the rubber backing projections. The fabric portions of this tread surface resist skidding and are held in place by the rubber portions lying beside them. This condition prevails until the tread has been worn down practically to the bases of the projections of the rubber backing. During the entire period of this wear a considerable extent of non-skidding tread surface is continuously present, as may be understood by reference to Fig. 2, where the lines $x$—$x$, $y$—$y$, and $z$—$z$, indicate successive degrees of wear.

I claim:—

1. A tire tread curved longitudinally and laterally to form the tread surface of a pneumatic tire and composed of wear-and-slip-resisting facing of frictioned textile fabric, and a backing of rubber vulcanized to the said facing, the facing and backing being molded to form elongated staggered external corrugations having angular apexes and arranged longitudinally of the tread, the apexes of the backing projections being above the depressions in the corrugated facing, so that the backing holds the depressed portions of the facing after the apexes of the facing corrugations have been worn away.

2. A tire tread curved longitudinally and laterally to form the tread surface of a pneumatic tire, and composed of a wear-and-slip-resisting facing of frictioned textile fabric, folded or plaited to form a series of stretches extending edgewise to the tread face, and a backing of rubber vulcanized to the said facing, the facing and backing being molded to form elongated staggered external corrugations having angular apexes and arranged longitudinally of the tread, the apexes of the backing projections being above the depressions in the corrugated facing, so that the backing holds the depressed portions of the facing after the apexes of the facing corrugations have been worn away, the removal of said apexes by wear causing the exposure of a multiplicity of thread ends which form non-skidding tread portions alternating with exposed fabric-holding portions of the rubber backing.

In testimony whereof I have affixed my signature, in presence of two witnesses.

PHILIP W. PRATT.

Witnesses:
 C. F. BROWN,
 P. W. PEZZETTI.